United States Patent
Gustafsson et al.

(10) Patent No.: US 8,668,587 B2
(45) Date of Patent: Mar. 11, 2014

(54) METHOD OF DETERMINING QUALITY OF SERVICE FOR ON-LINE GAMING IN A NETWORK

(75) Inventors: Jorgen Gustafsson, Lulea (SE); Gunnar Heikkila, Gammelstad (SE); Pontus Sandberg, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 226 days.

(21) Appl. No.: 12/680,928

(22) PCT Filed: Jul. 1, 2008

(86) PCT No.: PCT/SE2008/050813
§ 371 (c)(1),
(2), (4) Date: Mar. 31, 2010

(87) PCT Pub. No.: WO2009/045150
PCT Pub. Date: Apr. 9, 2009

(65) Prior Publication Data
US 2010/0273558 A1   Oct. 28, 2010

(30) Foreign Application Priority Data
Oct. 3, 2007   (SE) ........................................ 0702219

(51) Int. Cl.
*A63F 13/12*   (2006.01)
(52) U.S. Cl.
USPC .............................. 463/42; 370/252; 709/224
(58) Field of Classification Search
USPC ........ 463/40–42; 370/230, 252; 709/223, 224
See application file for complete search history.

(56) References Cited

U.S. PATENT DOCUMENTS

| 6,807,156 | B1* | 10/2004 | Veres et al. | 370/252 |
| 7,142,536 | B1* | 11/2006 | Gossett et al. | 370/360 |
| 2002/0045484 | A1* | 4/2002 | Eck et al. | 463/42 |
| 2002/0114296 | A1* | 8/2002 | Hardy | 370/332 |
| 2006/0149845 | A1 | 7/2006 | Malin et al. | |
| 2007/0064620 | A1* | 3/2007 | Defoort et al. | 370/252 |
| 2007/0299746 | A1* | 12/2007 | Haley et al. | 705/28 |
| 2008/0139197 | A1* | 6/2008 | Misra et al. | 455/423 |

FOREIGN PATENT DOCUMENTS

| CA | 2337707 A1 | 8/2002 |
| EP | 1784027 A1 | 5/2007 |
| GB | 2398703 A | 8/2004 |
| JP | 2004357968 A | 12/2004 |
| JP | 2007135040 A | 5/2007 |
| WO | 02/39673 A1 | 5/2002 |

OTHER PUBLICATIONS

"Analysis of Factors Affecting Players' Performance and Perception in Multiplayer Games", Matthias Dick et al, NetGames '05, Oct. 10-11, 2005, Hawthorne, New York, USA.*

"Mobile Phone Gaming (A Follow-up Survey of the Mobile Phone Gaming Secor and its Users)", Tobias Fritsch et al, 2006, Proceedings of the 5$^{th}$ conference on Entertainment Computing, pp. 292-297.*

(Continued)

*Primary Examiner* — Damon Pierce
(74) *Attorney, Agent, or Firm* — Coats & Bennett, PLLC

(57) ABSTRACT

In a method and a device for determining the perceived quality of service for a wireless gaming service a perceived gaming quality is determined based on measurable game and transport parameters.

20 Claims, 2 Drawing Sheets

(56) References Cited

OTHER PUBLICATIONS

Bussiere, J-A. et al. "Empirical Measurements of Player QoS Sensitivity for the Xbox Game Halo2." CAIA Technical Report 050527A, May 2005.

Zhou, X. et al. "Estimation of Perceived Quality of Service for Applications on IPv6 Networks." Proceedings of the 1st ACM Workshop on Performance Monitoring and Measurement of Heterogeneous Wireless and Wired Networks, PM2HW2N 2006, Terromolinos, Spain, Oct. 2, 2006.

Chen, K. et al., "On the Sensitivity of Online Game Playing Time to Network QoS", 25th IEEE International Conference on Computer Communications Proceedings, Apr. 1, 2006, pp. 1-12.

Chen, J. et al., " Locality Aware Dynamic Load Management for Massively Multiplayer Games'', Proceedings of the Tenth ACM Sigplan Symposium on Principles and Practice of Parallel Programming", Jan. 1, 2005, pp. 289-300.

Ghosh, P. et al., "A Cross-Layer Design to Improve Quality of Service in Online Multiplayer Wireless Gaming Networks", 2005 2nd International Conference Broadband Networks, Oct. 3-7, 2005, pp. 875-884, Boston, MA.

Yu, Y. et al., "Grid Computing on Massively Multi-User Online Platform", Proceedings of 16th International Conference on Computer Communications and Networks, Aug. 1, 2007, pp. 135-140.

* cited by examiner

METHOD OF DETERMINING QUALITY OF SERVICE FOR ON-LINE GAMING IN A NETWORK

TECHNICAL FIELD

The present invention relates to a method and a device for determining the on-line gaming quality of service in a network.

BACKGROUND

Today on-line gaming, with popular games like Counter-Strike and World of Warcraft, has become one of the most important services in wireline Internet access. With the introduction of new high performance wireless networks on-line games can now also be played over a radio network.

In radio and fixed networks the Quality of service or Quality of experience (QoS or QoE), and how the end-user perceives a service, has been measured for speech for many years, and new methods emerge to measure the quality of multimedia services. Typically, measurements are done with objective models, which take measurable input parameters and calculates an opinion score representing the end-user perceived quality.

Studies have been done to investigate how network properties, such as packet latency, affect the quality of on-line gaming, see for example T. Lang, \User Experience while playing Halo with network delay or loss," Centre for Advanced Internet Architectures, CAIA, Swinburne University of Technology, Tech. Rep. 031205A, December 2003. [Online]. Available: http://www.caia.swinburne.edu.au/ and P. Branch and G. Armitage, \Measuring the auto-correlation of server to client traffic in First Person Shooter games," Swinburne University, December 2003. [Online] Available: http://www.caia.swinburne.edu.au/, which both address the playing phase of on-line gaming.

However, there exist no way for a service provider to measure the perceived quality of an on-line gaming session using a wireless or wireline connection.

SUMMARY

Embodiments of the present invention advantageously provide an objective quality measurement for an on-line gaming session.

Embodiments of the present invention also provide a model that can be used to provide an objective quality measurement for on-line gaming.

More particularly, embodiments of the present invention estimate the end-user perceived quality of on-line gaming based on measurable game and transport parameters. Hereby it is possible to provide an accurate measure for an ongoing on-line gaming session for the service provider.

The estimated quality may take into account different phases of on-line gaming, i.e. periods during an on-line gaming session having different data transfer characteristics or real time constraints. Examples of such phases can be a load phase where the game or game data is loaded and playing phase where the game is played on-line. The present invention enables the service provider to obtain an objective quality measure that take different on-line gaming phases into account thereby providing a measure better reflecting the perceived service quality.

In accordance with one embodiment, the estimated quality is based on gaming parameters, such as loading time, and on network transport parameters, such as packet loss, packet latency/delay, and packet jitter. In addition the input parameters can be either measured directly, or estimated based on other measurement parameters. For example the game loading time can be estimated based on transport parameters like throughput.

The output of the on-line gaming model is an end-user perceived gaming quality score, typically a numerical value representing a Mean Opinion Score (MOS) that can be used to determine the quality of service delivered to a particular subscriber.

The model can advantageously be tuned using results from subjective test, where test persons have been playing a game and giving a quality score, which then are used to calculate a MOS score.

BRIEF DESCRIPTION OF THE DRAWINGS

The present invention will now be described in more detail by way of non-limiting examples and with reference to the accompanying drawings, in which.

DETAILED DESCRIPTION

Figure 1:
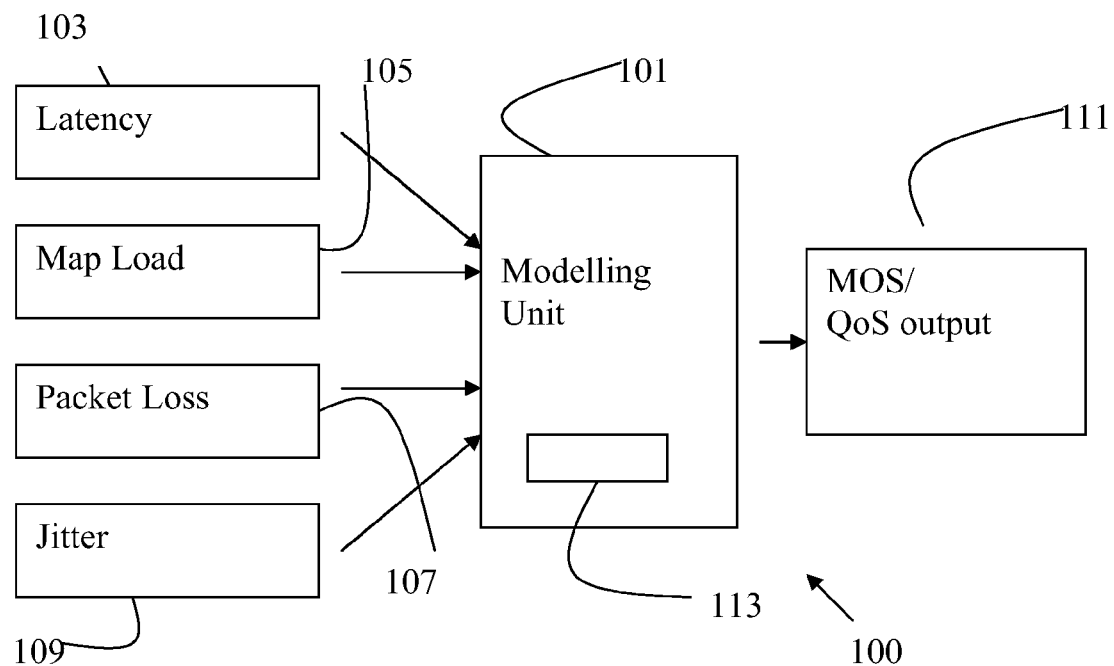
FIG. 1 is a view illustrating a device for determining the quality of service for an on-line gaming service.

In FIG. 1, a device 100 for determining the Quality of Service for an on-line gaming session over a network is shown. The device comprises a modeling unit, or circuit, 101. The modeling unit 101 is connected to a number of input ports 103, 105, 107 and 109. The input ports provide the modeling unit 101 with input data useful as input data in a prediction model. For example the input port 103 may provide values related to packet latency, the input port 105 may provide values related to map load, i.e. game loading time, the input port 107 may provide values related to packet loss and the input port 109 may provide values related to packet jitter. Using the different input data provided through the input ports 103-109, the modeling unit calculates a MOS score representing the end-user perceived quality. The model used can be any suitable model such as described below and can be implemented using a computer program product 113 loaded into the modeling unit 101. The MOS score is then used as a basis for determining the quality provided to the end-user in an output unit, or circuit, 111.

The input parameters are not limited to the ones described above. Other input parameters from the transport layer and from the gaming application can also be used to get a good prediction of the on-line gaming quality.

In one embodiment of our invention the output MOS can be calculated using a linear model. In accordance with another embodiment a non-linear model is employed.

For example the modeling unit 101 may be adapted to generate an index which may be termed a Game Quality Index, GQI, as follows. The GQI quality models estimates a predicted Mean Opinion Score, MOS, from the input function, which depend on variables such as latency $x_{latency}$ and map load $y_{mapload}$. A parameter $GQI_{BASE}$ can be set to steer the model initial value, i.e. maximal model output if no degradation from latency $x_{latency}$ and map load $y_{mapload}$ occurs. Another parameter $GQI_{MIN}$ adapts output to MOS, where minimal MOS value is 1. The functions can be set to only exist in the span [0; 1]. If no other input related to other variables such jitter and packet loss is used a linear $GQI_{MOS}$ model can be formulated as:

$$GQI_{MOS}=GQI_{MIN}+GQI_{BASE}*(Q_{xlatency})*(Q_{ymapload}) \quad \text{Eq 1}$$

where $$Q_{xlatency}=a*x_{latency}+1,2 \text{ (or some other suitable constant)} \quad \text{Eq 2}$$

$$Q_{ymapload}=b*y_{mapload}+1,4 \text{ (or some other suitable constant)} \quad \text{Eq 3}$$

Where a can be 0.0053 in one embodiment and b can be 0.0075. A linear model as $GQI_{MOS}$ demands boundary conditions to prevent MOS predictions outside the scale. For $Q_{xlatency}$ predetermined maximum and minimum values are determined. For example values below 40 and above 225 ms can be set to model maximum respective minimum values. $Q_{ymapload}$ can also have predetermined boundary conditions. For example boundary conditions of below 55 and over 180 seconds can be used to ensure an authorized MOS value.

The gaming quality can also be calculated using a non-linear function. For example the following equations may be used:

$$GQI_{MOS}=GQI_{MIN}+GQI_{BASE}*(Q_{xlatency})*(Q_{ymapload}) \quad \text{Eq4}$$

Where $$Q_{xlatency}=1/(1+(\text{alpha}*x_{latency})^3)) \quad \text{Eq5}$$

$$Q_{ymapload}=0.6-\text{beta}*a\tan((1/\text{gamma})*(y_{mapload}-TH)) \quad \text{Eq6}$$

where constants alpha, beta and gamma are 110, 2.3 and 165 respectively. The two Q degradation functions exists only within the span [0,1], and no bounding conditions are needed. This model has a more smooth behavior than the linear model and is more suited to the data set. Due to measured patience from the users when entering the game, the threshold parameter TH equals 220 and steers the quality degradation in the $Q_{ymapload}$ function together with beta and gamma.

The gaming model can also take the effect of packet loss and jitter into account when estimating the perceived quality. In accordance with one embodiment the Gaming Quality Index can then be modeled and calculated as:

$$GQI_{MOS}=GQI_{MIN}+GQI_{BASE}*(Q_{xlatency})*(Q_{ymapload}))*(Q_{zjitter}))*(Q_{wpacketloss}) \quad \text{Eq7}$$

where $$Q_{zjitter}=-0.0022*z_{jitter}+1 \quad \text{Eq8}$$

$$Q_{wpacketloss}=-0.24*w_{packetloss}+1 \quad \text{Eq9}$$

The jitter is in Eq8 above is given in milliseconds and the packet loss in percent. The maximum boundary for jitter can be set to 450 ms and for packet loss the maximum boundary can be set to 4%. The parameters and constants in equations 8 and 9 can of course be adjusted to suit a particular application.

A gaming quality determination can be implemented at various locations in a network. It can be implemented in a drive test tool for a radio network, in any computer running an on-line game, and in measurement locations in a network, but then producing a score representing the measurement location, not the end-user terminal or computer. The implementation can also be done in a network but the input parameters are reported from a computer running an on-line game.

Figure 2:
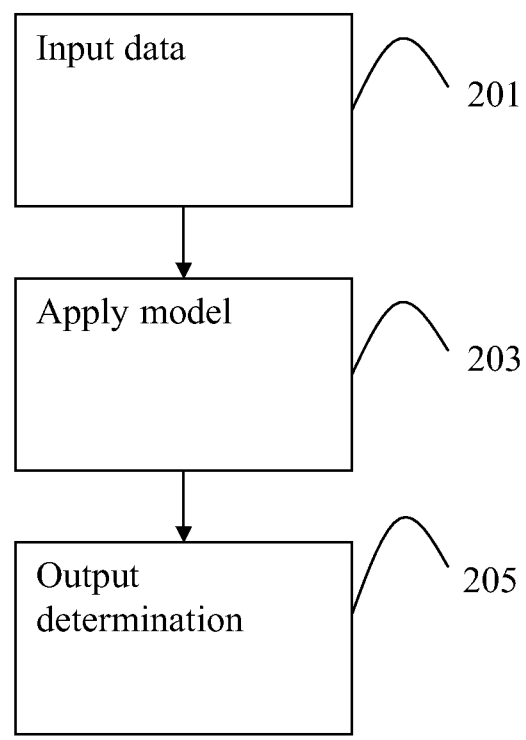
FIG. 2 is a flow chart illustrating different steps performed when determining the quality of service for an on-line gaming service.

In FIG. 2 a flowchart illustrating different steps performed when determining an objective online game quality of service is shown. First, in a step 201, data for a number of different parameters related to the perceived service quality are collected. The parameters may include any of the parameters above or any other relevant parameters. Next in a step 203, the collected data is used as input in a model modeling the perceived service quality based on both measurable game parameters and measurable transport parameters. The model used in step 203 can advantageously be tuned to correspond to experiences in a test group of people. In step 203 the input data as fed to the model yields a prediction as to what a real person would think of the service quality based on the specific set of input data.

Finally, in a step 205, the prediction generated in step 203 is used as a determination of the current level of service quality at a particular point in a wireless or fixed network, typically at an end-user device or at any other location in the network where the service provider is interested in knowing the quality of service.

Using the method and device as described herein input parameters are used to calculate a quality score for on-line gaming which can be used by a service provider to monitor and ensure that services are delivered to subscribers in accordance with what the subscribers expect. The invention further provides for an analysis of different gaming phases, such as gaming load phase and gaming playing phase.

The invention claimed is:

1. A method implemented by a device for determining a perceived quality of service for an on-line gaming service, comprising:
    determining one or more measurable game parameters from a gaming application associated with the on-line gaming service by analyzing, using the device, at least one of a loading phase and a playing phase of on-line gaming while the on-line gaming service is being provided; and
    objectively determining, using the device, a value for the perceived quality of service for the on-line gaming service based on the one or more measurable game parameters and one or more measurable transport parameters from a transport layer over which the on-line gaming service is transported.

2. The method of claim 1, wherein the one or more measurable game parameters include loading time associated with the loading phase.

3. The method of claim 2, wherein the one or more measurable transport parameters include at least one of packet loss, packet latency/delay, packet jitter, and throughput.

4. The method of claim 1, wherein the one or more measurable transport parameters include at least one of packet loss, packet latency/delay, packet jitter, and throughput.

5. The method of claim 1, wherein determining the value for the perceived quality comprises determining a Game Quality Index (GQI) $GQI_{MOS}$ that estimates a predicted Mean Opinion Score (MOS) as $GQI_{MOS}=GQI_{MIN}+GQI_{BASE}*(Q_{xlatency})*(Q_{ymapload})$, where $GQI_{MIN}$ adapts output to MOS, $GQI_{BASE}$ steers an initial value of $GQI_{MOS}$, and where $Q_{xlatency}$ and $Q_{ymapload}$ respectively represent packet latency as one of said one or more measurable transport parameters and loading time as one of said one or more measurable game parameters.

6. The method of claim 1, wherein determining the value for the perceived quality comprises determining a Game Quality Index (GQI) $GQI_{MOS}$ that estimates a predicted Mean Opinion Score (MOS) as $GQI_{MOS}=GQI_{MIN}+GQI_{BASE}*(Q_{xlatency})*(Q_{ymapload})*(Q_{zjitter})*(Q_{wpacketloss})$, where $GQI_{MIN}$ adapts output to MOS, $GQI_{BASE}$ steers an initial value of $GQI_{MOS}$, where $Q_{xlatency}$, $Q_{zjitter}$, and $Q_{wpacketloss}$ respectively represent packet latency, packet jitter, and packet loss as said measurable transport parameters, and where $Q_{ymapload}$ represents loading time as one of said one or more measurable game parameters.

7. The method of claim 1, wherein determining the perceived gaming quality comprises determining a mean opinion score representing the perceived gaming quality.

8. A device configured to determine the perceived quality of service for an on-line gaming service, the device comprising:
one or more circuits configured to:
determine one or more measurable game parameters from a gaming application associated with the on-line gaming service by analyzing at least one of a loading phase and a playing phase of on-line gaming while the on-line gaming service is being provided; and
objectively determine a value for the perceived quality of service for the on-line gaming service based on the one or more measurable game parameters and one or more measurable transport parameters from a transport layer over which the on-line gaming service is transported.

9. The device of claim 8, wherein said one or more circuits are configured to determine a perceived gaming quality based on loading time as one game parameter.

10. The device of claim 9, wherein said one or more circuits are configured to determine a perceived gaming quality based on at least one of packet loss, packet latency/delay, packet jitter, and throughput as one transport parameter.

11. The device of claim 8, wherein said one or more circuits are configured to determine a perceived gaming quality based on at least one of packet loss, packet latency/delay, packet jitter, and throughput as one transport parameter.

12. The device of claim 8, wherein said one or more circuits are configured to determine the value for the perceived quality by determining a Game Quality Index (GQI) $GQI_{MOS}$ that estimates a predicted Mean Opinion Score (MOS) as $GQI_{MOS}=GQI_{MIN}+GQI_{BASE}*(Q_{xlatency})*(Q_{ymapload})$, where $GQI_{MIN}$ adapts output to MOS, $GQI_{BASE}$ steers an initial value of $GQI_{MOS}$, and where $Q_{xlatency}$ and $Q_{ymapload}$ respectively represent packet latency as one of said one or more measurable transport parameters and loading time as one of said one or more measurable game parameters.

13. The device of claim 8, wherein said one or more circuits are configured to determine the value for the perceived quality by determining a Game Quality Index (GQI) $GQI_{MOS}$ that estimates a predicted Mean Opinion Score (MOS) as $GQI_{MOS}=GQI_{MIN}+GQI_{BASE}*(Q_{xlatency})*(Q_{ymapload})*(Q_{zjitter})*(Q_{wpacketloss})$, where $GQI_{MIN}$ adapts output to MOS, $GQI_{BASE}$ steers an initial value of $GQI_{MOS}$, where $Q_{xlatency}$, $Q_{zjitter}$, and $Q_{wpacketloss}$ respectively represent packet latency, packet litter, and packet loss as said measurable transport parameters, and where $Q_{ymapload}$ represents loading time as one of said one or more measurable game parameters.

14. The device of claim 8, wherein the one or more circuits are configured to determine a mean opinion score representing the perceived gaming quality.

15. A computer program product for determining the perceived quality of service for an on-line gaming service, the computer program product comprising computer program code embodied in a non-transitory computer-readable storage medium, the computer program code comprising:
code configured to:
determine one or more measurable game parameters from a gaming application associated with the on-line gaming service by analyzing at least one of a loading phase and a playing phase of on-line gaming while the on-line gaming service is being provided; and
objectively determine a value for the perceived quality of service for the on-line gaming service based on the one or more measurable game parameters and one or more measurable transport parameters from a transport layer over which the on-line gaming service is transported.

16. The computer program product of claim 15, wherein said code is configured to determine a perceived gaming quality based on loading time as one game parameter.

17. The computer program product of claim 16, wherein said code is configured to determine a perceived gaming quality based on at least one of packet loss, packet latency/delay, packet jitter, and throughput as one transport parameter.

18. The computer program product of claim 15, wherein said code is configured to determine a perceived gaming quality based on at least one of packet loss, packet latency/delay, packet jitter, and throughput as one transport parameter.

19. The computer program product of claim 15, wherein said code is configured to determine the value for the perceived quality by determining a Game Quality Index (GQI) $GQI_{MOS}$ that estimates a predicted Mean Opinion Score (MOS) as $GQI_{MOS}=GQI_{MIN}+GQI_{BASE}*(Q_{xlatency})*(Q_{ymapload})$, where $GQI_{MIN}$ adapts output to MOS, $GQI_{BASE}$ steers an initial value of $GQI_{MOS}$, and where $Q_{xlatency}$ and $Q_{ymapload}$ respectively represent packet latency as one of said one or more measurable transport parameters and loading time as one of said one or more measurable game parameters.

20. The computer program product of claim 15, wherein said code is configured to determine the value for the perceived quality by determining a Game Quality Index (GQI) $GQI_{MOS}$ that estimates a predicted Mean Opinion Score (MOS) as $GQI_{MOS}=GQI_{MIN}+GQI_{BASE}*(Q_{xlatency})*(Q_{ymapload})*(Q_{zjitter})*(Q_{wpacketloss})$, where $GQI_{MIN}$ adapts output to MOS, $GQI_{BASE}$ steers an initial value of $GQI_{MOS}$, where $Q_{xlatency}$, $Q_{zjitter}$, and $Q_{wpacketloss}$ respectively represent packet latency, packet jitter, and packet loss as said measurable transport parameters, and where $Q_{ymapload}$ represents loading time as one of said one or more measurable game parameters.

* * * * *

UNITED STATES PATENT AND TRADEMARK OFFICE
CERTIFICATE OF CORRECTION

PATENT NO. : 8,668,587 B2  Page 1 of 1
APPLICATION NO. : 12/680928
DATED : March 11, 2014
INVENTOR(S) : Gustafsson et al.

It is certified that error appears in the above-identified patent and that said Letters Patent is hereby corrected as shown below:

In the specification

In Column 3, Lines 41-42, in Equation (7), delete "  ",
and insert -- $GQI_{MOS} = GQI_{MIN} + GQI_{BASE} * (Q_{xlatency}) * (Q_{ymapload}) * (Q_{zjitter}) * (Q_{wpacketloss})$ --, therefor.

In the claims

In Column 5, Line 48, in Claim 13, delete "litter," and insert -- jitter, --, therefor.

Signed and Sealed this
Twenty-second Day of March, 2016

Michelle K. Lee
*Director of the United States Patent and Trademark Office*